Nov. 19, 1929.　　　J. W. CHRISTIE　　　1,736,391
DRIVE FOR MOTOR VEHICLES
Filed Feb. 23, 1929　　　4 Sheets-Sheet 1

Inventor
John Walter Christie
By Attorneys

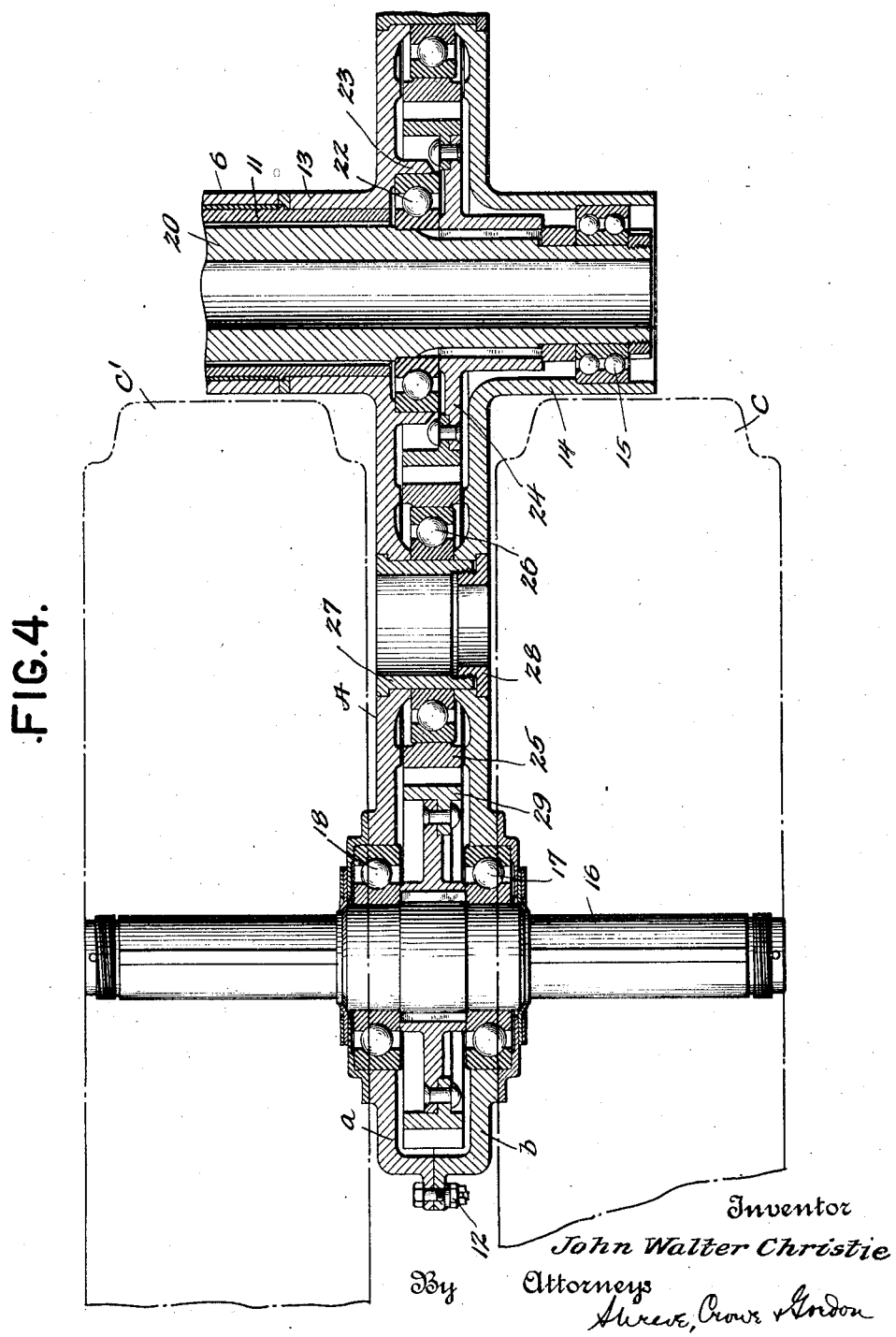

Nov. 19, 1929.  J. W. CHRISTIE  1,736,391
DRIVE FOR MOTOR VEHICLES
Filed Feb. 23, 1929  4 Sheets-Sheet 4
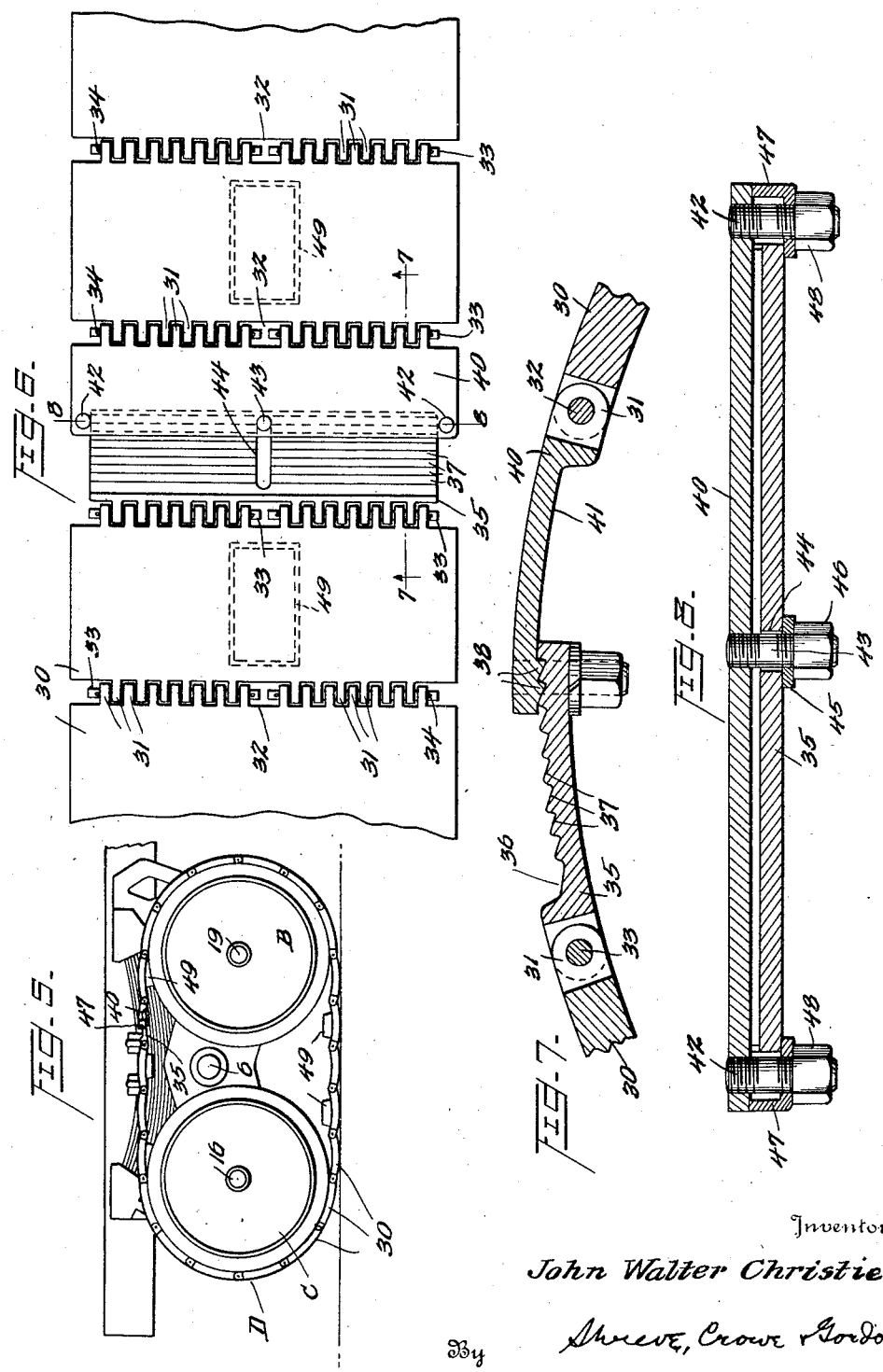
Inventor
John Walter Christie
By Shreve, Crowe & Gordon
Attorneys Patented Nov. 19, 1929

1,736,391

UNITED STATES PATENT OFFICE

JOHN WALTER CHRISTIE, OF AVON, NEW JERSEY, ASSIGNOR, BY MESNE ASSIGNMENTS, TO BROWNING CRANE COMPANY, OF CLEVELAND, OHIO, A CORPORATION OF OHIO

DRIVE FOR MOTOR VEHICLES

Application filed February 23, 1929. Serial No. 342,003.

It has been proposed heretofore to mount four wheels on a single dead axle and drive them in pairs through live axle sections. In such construction two wheels are mounted on each side of a vehicle and journaled in a rigid carrier which in turn is journaled on the dead axle so that it may rock and thereby permit the wheels of the pair to adapt themselves to irregularities in the terrene. With this carrier has been associated means for driving the wheels of a pair simultaneously from a single live axle section.

The improved drive embodies some of the characteristics of the known drive referred to above but differs therefrom in several important respects whereby greater traction is secured, torque reactions are equalized, unsprung weight is reduced to a minimum and greater efficiency and a reduction in the stresses on the units are accomplished.

In accordance with the invention there is provided an eight wheel drive in which the wheels are mounted in pairs on opposite sides of the vehicle, two pairs being on each side and the two pairs on each side being so related as to insure a better distribution of the load and an equalization of the stresses impressed on the units. Not only are the torque reactions balanced by the improved disposition of wheels and driving elements but stresses arising from side sway and irregularities in the terrene are also effectively counteracted by mutual interaction.

An important object of this invention is the provision of an eight wheel traction structure and drive mechanism comprising a four wheel unit on each side of the chassis adapted for interchangeable connection with an endless track, whereby the vehicle is convertible from a road vehicle to one of the caterpillar or track-laying type as desired.

Other advantages of the improved drive will appear more clearly as the description proceeds, among which may be noted minimum unsprung weight and the advantageous disposition of antifriction bearings for all of the rotating parts in the drive.

Reference is now to be had to the accompanying drawings which illustrate somewhat conventionally a motor vehicle chassis to which the improved drive has been adapted and wherein:

Fig. 4 is a view in horizontal section through a portion of the carrier shown in Fig. 1 and taken on the plane indicated by the line 4—4 and looking in the direction of the arrows.

Fig. 5 is a side view of the rear wheels of a vehicle with track attached.

Fig. 6 is a plan view of a portion of the track, showing the two complemental connecting links.

Fig. 7 is a section on line 7—7 of Fig. 6; and

Fig. 8 is a section taken on the line 8—8 of Fig. 6.

The improved drive, which may be adapted to any type of vehicle where found advantageous, is illustrated in the accompanying drawings as constituting the drive for a motor truck chassis indicated at 1 wherein there are mounted conventional units such as the engine 2, transmission 3, propeller shaft 4 and final drive differential gearing 5. The invention is not concerned with the nature of any of these parts.

Figure 1:
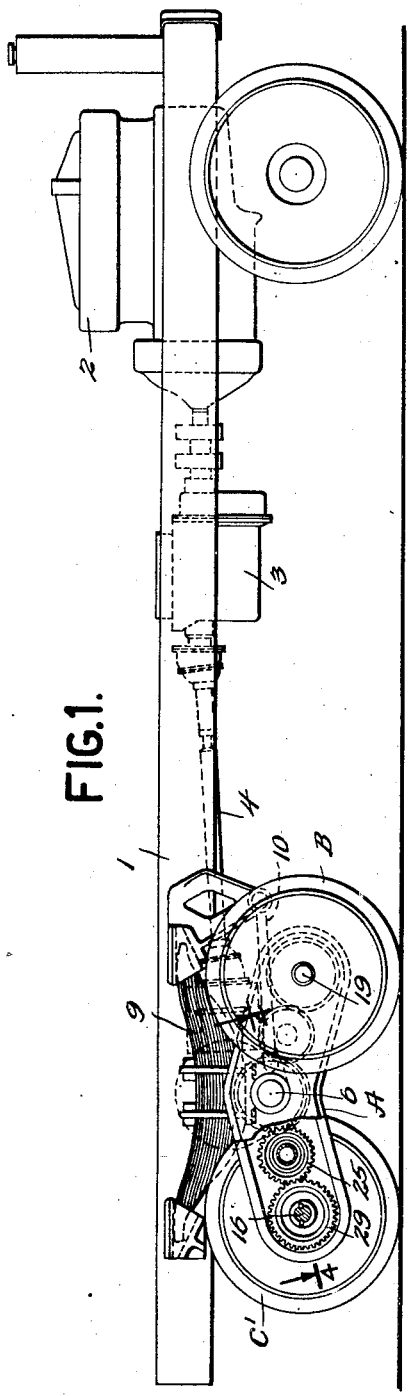
Fig. 1 is a view in side elevation of such a vehicle, a part of the carrier being broken away to show the relation of the driving gears for one set of wheels.

The improved drive may be considered as comprising several associated parts whereby the function of supporting the chassis 1 and the function of propelling it are advantageously discharged. The load carrying axle is indicated at 6 and is enlarged centrally to receive the final drive transmission gearing 5, its associated bearings 7 and reduction gearing 8 when employed. The springs 9 for the vehicle are carried by the load carrying axle 6 in accordance with conventional practice and radius rods 10 may be interposed operatively between the load carrying axle and the chassis frame for the usual purpose. Within the open tubular ends of the load carrying member 6 are mounted tubes 11 of such strength and length as will enable them to support the improved carrier A and associated transmission mechanism. This carrier comprises generally two sections a, b, which are bolted together as indicated at 12, one section a having a tubular extension 13 which is journaled on the tube 11 and the other section b having an aligned, oppositely extending tubular extension 14 which receives antifriction bearings 15 for the purpose to be described. The general outline of the carrier A is indicated in Fig. 1.

Figure 2:
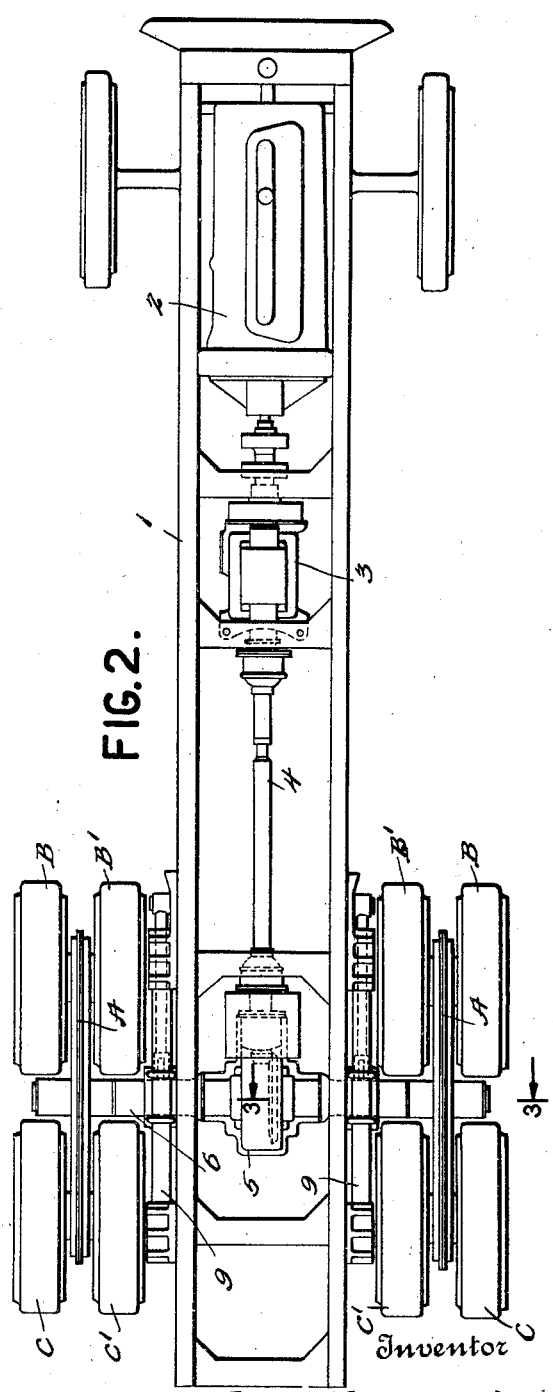
Fig. 2 is a view in plan of the vehicle shown in Fig. 1.

With the carrier A supported at its midsection on the load carrying member 6, in the manner described, provision is made for supporting the vehicle wheels in the carrier in advantageous relation to one another for driving and load carrying purposes. As indicated in Fig. 2 four wheels are provided at each side of the vehicle with the result that an eight wheel drive is afforded. For the purposes of this specification the four wheels at one side only will be described since they are duplicated at the other side of the vehicle. The wheels B and B', which are supported on a common stub axle, will be hereinafter referred to as constituting a pair as will be the wheels C and C', which are likewise journaled on a common stub axle. The axle for the wheels C and C' is indicated at 16 in Fig. 4. This stub axle is journaled in the carrier A by means of antifriction bearings 17, 18, supported respectively, in the sections a, b, of the carrier. By this disposition the wheels C, C', are mounted symmetrically on opposite sides of the carrier and in the most advantageous load carrying relationship. The pair of wheels B, B', are similarly mounted on a single stub axle 19 at the other end of the carrier, the two axles being spaced equidistant from the center line of the load carrying axle 6. Since the carrier A is free to rock about the load carrying axle 6 it will be clear that the respective pairs of wheels are free to follow irregularities in the terrene. By providing four load carrying wheels at each side of the vehicle the advantage of eight points of support are secured, these advantages now being recognized in respect of traction, unit ground pressure, riding qualities, etc. Stresses arising from side sway are mutually resisted by these eight wheels and their respective bearings. By disposing the two wheels of each pair in symmetrical relation to one another and to the respective carriers and by disposing the wheels before and behind the load carrying axle in symmetrical relation, respectively, and by disposing the four wheels at one side of the vehicle in symmetrical relation to the four wheels of the other side, a complete balance and harmony are achieved in the support of the load under all operating conditions and unbalanced twisting stresses on the chassis and driving parts are reduced to a minimum.

The improved means for applying driving power to the several wheels will now be described.

Figure 3:
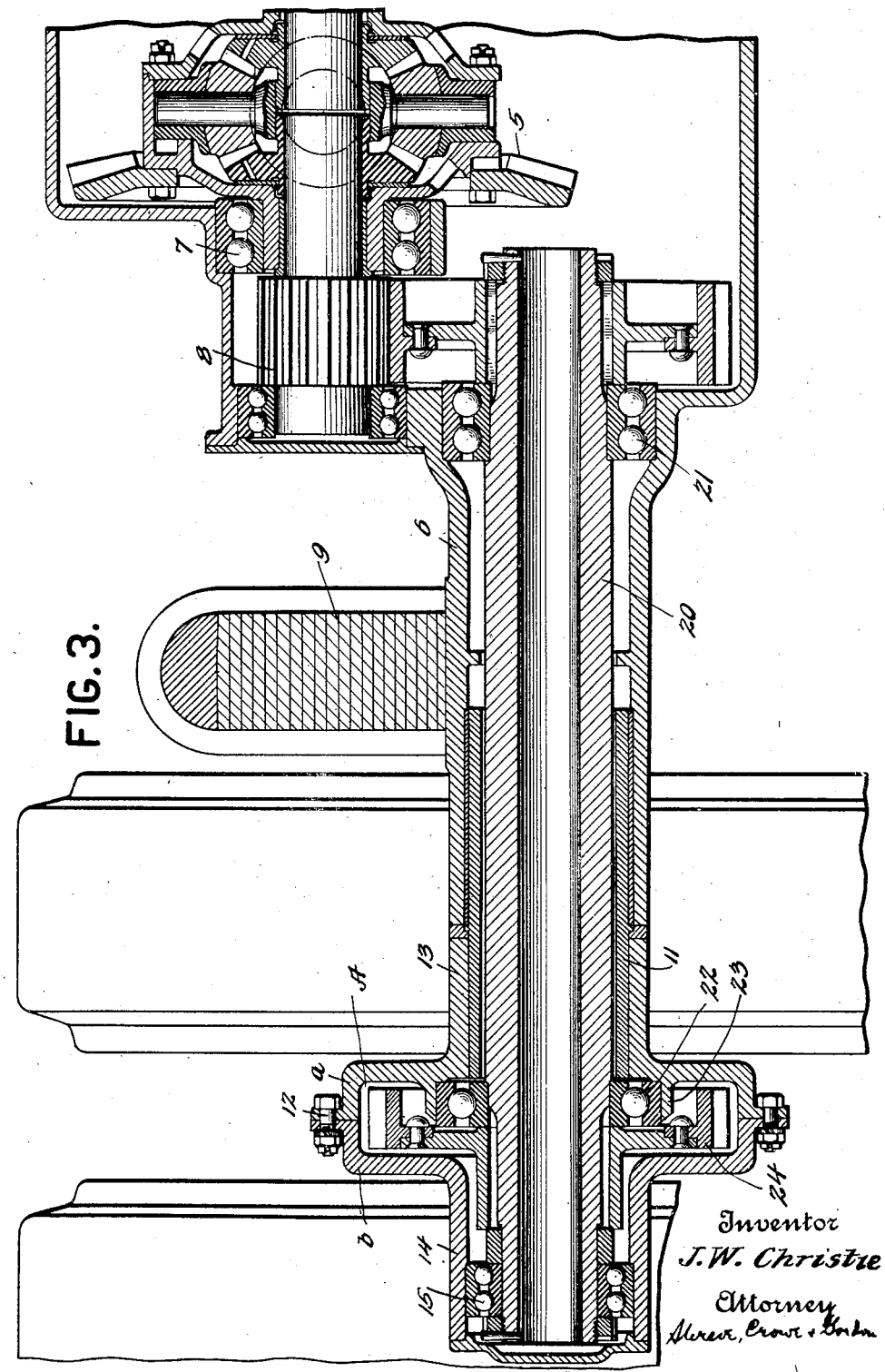
Fig. 3 is a fragmentary view in section and on a larger scale showing the final drive gear and the relation thereto of one of the live axle sections and of the dead axle whereby the carrier at one side of the vehicle is supported for rocking, the view being taken on the plane indicated by the line 3—3 of Fig. 2 and looking in the direction of the arrows.

Within the load carrying axle 6 and its associated parts including the tube 11 and the tubular extensions 13, 14, of the carrier, all of which parts are concentric and generally aligned, is journaled a tubular live axle member 20. This section is journaled preferably in three anti-friction bearings one of which 21 is preferably adjacent its inner end, another of which 15 is preferably adjacent its other end at a point beyond the carrier A and the third of which 22 is preferably disposed substantially centrally of the carrier itself. The bearing 22 may be supported on a flange 23 formed on the inner face of the section A of the carrier as illustrated in Fig. 3. On the live axle section 20 is keyed a spur gear 24 by which the stub axles 16 and 19 are driven through similar gear trains. The gear 24 is disposed within the carrier A and meshes with an idler gear 25 journaled in the carrier on an antifriction bearing 26. For lightness and in the interest of assembling the bearing 26 may be supported on a tubular shaft 27 extending through the sections of the carrier A and held in place by a flanged ring 28 threaded thereto. The idler gear 25 meshes with the gear 29 which is keyed on the stub shaft 16 for the wheels C, C', splined thereon. The train of gearing described is duplicated at the other side of the master gear 24 in order to provide for driving of the other stub axle 19 on which are splined the other pair of wheels A, A'.

The drive described insures the positive transmission of power from the live axle sections to the four wheels at the side of the vehicle end and rotation at equal speeds. All of the rotating members are journaled within the carrier A on the antifriction bearings and within the carrier may be contained a lubricant. By the symmetrical disposition of parts and the disposition of the various bearings torque reactions are advantageously absorbed, torsional stresses are minimized and free operation is assured during incidental rocking movements of the carrier about the load carrying members. While four wheels on a side are thus simultaneously and positively driven from one live axle section it will be understood that differentiation between the four wheels on one side and the four wheels on the other is permitted by the final drive differential gearing 5. This relationship is maintained regardless of the relative angular position of the carriers on opposite sides as the respective wheels adapt themselves to irregularities of the ground surface at opposite sides of the vehicle.

As pointed out hereinbefore, the improved drive is characterized by simplicity of construction, positiveness in operation, accessibility of parts in assembly and in inspection and replacement and by the advantages of an eight wheel drive where the four pairs of wheels may have free relative movement to adapt themselves to the ground conditions which they encounter. The advantages of an eight wheel drive are thus accomplished with the inclusion in the vehicle of only a single load carrying axle and two live axle sections and two vehicle springs between the load carrying axle and the frame. Not only does this result in the fewest possible number of parts where the advantages of an eight wheel drive are to be retained but adds in addition maximum flexibility as regards the action of the wheels with respect to one another and with respect to the frame.

The tires shown on the several wheels of the improved drive are illustrated conventionally as of the solid type but it is to be understood that under some conditions of service pneumatic tires may be used to even greater advantage since by their use even better riding qualities are obtained while such improvements as result from the improved drive mechanism are wholly retained.

From the above description it is apparent that I have designed an eight wheel traction unit comprising a four wheel unit on each side of the chassis, presenting an extensive road contact traction area adapted for heavy duty service and a novel drive mechanism associated with said unit whereby heavy loads may be transported under uneven and soft surface road conditions, and in order to further effectuate the principles of my invention, I have designed a unique endless track structure adapted to be quickly mounted on each of the four wheel units, whereby the vehicle is expeditiously converted from a road vehicle to one of the caterpillar or track laying type, further increasing the surface contacting area and rendering it possible to transport heavy loads over otherwise impassable roads, and which structure is illustrated in Figs. 5, 6, 7 and 8 of the drawings.

In Fig. 5 there is shown an endless track D comprising links 30 formed along each of their longitudinal edges with projections 31 and providing an extra wide space midway the length of the link as at 32. The projections 31 are apertured and adapted for tenon engagement with similar projections of the adjacent link, the apertures being properly aligned to receive hinge pins 33 secured by pins 34 providing a hinged connection between the respective links and the track D, and by the use of two pins a flexible hinged connection is provided.

In order to connect the free ends of the chain, the final link 35 at one end is secured by pins 33 as heretofore described, and is reduced as at 36 to form the body portion of less thickness than the links proper and its face is formed with longitudinally extending female serrations 37 adapted to receive the complemental male serrations 38 formed on the under surface of the complemental link 40, which has its under surface reduced as at 41, so that the engaging portions of said links 35 and 40 will be substantially the same thickness as the links proper. Said link 40 is secured to the opposite end of the track by pins 33 as heretofore described, and is provided with bolts 42 at each of its ends and bolt 43 central of the link in alignment with bolts 42 threadedly or otherwise suitably secured thereto and adapted to extend downwardly from said link. The link 35 is of less length than link 40, so that bolts 42 project downwardly adjacent the opposite ends of said link and bolt 43 extends through slot 44 in link 35 and is adapted to receive lock washer 45 and nut 46. An angle clamp 47 is mounted on each of the bolts 42, the extremity of the perpendicular portion contacting the under surface of link 40 and the end of the lateral portion contacting the under surface of link 35, so that tightening of nuts 48 thereon firmly secures the links 35 and 40 together similar to the tightening of nut 46 with respect to bolt 43.

It will be observed that when the track D is operatively secured about the wheels B$^a$ and B$^{a\prime}$ and C$^a$ and C$^{a\prime}$ the bolts 42 will extend on opposite outside edges of the tires of the respective wheels and the bolt 43 will extend intermediate said wheels. Suitably secured by rivets or in any other well known manner to the under surface of links 30 central of their length are the projections 49 adapted to extend between wheels C$^a$, and C$^{a\prime}$ and B$^a$ and B$^{a\prime}$ effectually preventing lateral displacement of the track from said wheels.

It will be observed that to convert the road vehicle into one of the caterpillar or track laying type it is but necessary to mount the track on each four wheel unit, bringing the serrations of links 35 and 40 into engagement, and whereby the desired tensioning of the track with respect to the four wheel unit may be expeditiously effected, and said links locked in the desired adjusted position by tightening nuts 46 and 48 as above described. No further operation is necessary to secure the track about the traction unit, frictional engagement of the tires of the traction unit with the inner surface of the chain effects laying thereof without the necessity of employing other means, as will be well understood without further discussion.

Although in practice I have found that the form of my invention illustrated in the accompanying drawings and referred to in the above description as the preferred embodiment, is the most efficient and practical; yet realizing the conditions concurrent with the adoption of my invention will necessarily vary, I desire to emphasize that various minor changes in details of construction, proportion and arrangement of parts, may be resorted to within the scope of the appended claims without departing from or sacrificing any of the principles of this invention.

Having thus described my invention, what I desire protected by Letters Patent is as set forth in the following claims:

1. In a motor vehicle a load carrying axle, a carrier mounted pivotally on the axle at each side of the vehicle, two pairs of wheels mounted on opposite sides of the carrier and of the axle, respectively, two live axle sections within the load carrying axle, and means to drive two pairs of wheels at each side of the vehicle from one of said live axle sections.

2. In a motor vehicle a load carrying axle, a carrier mounted pivotally on the axle at each side of the vehicle, two pairs of wheels mounted on opposite sides of the carrier and of the axle, respectively, two live axle sections within the load carrying axle, and means disposed within each carrier to drive the two pairs of wheels mounted thereon from the respective live axle sections.

3. In a motor vehicle, eight wheel drive mechanism comprising a load carrying axle, carriers supported pivotally thereon at opposite sides of the vehicle, stub axles journaled in the respective carriers at equidistant points on opposite sides of the load carrying axle, wheels mounted on said stub axles in pairs on opposite sides of the respective carriers, and means disposed within the load carrying axle and the carriers for driving all of said wheels from a single final drive gear.

4. In a motor vehicle, eight wheel drive mechanism therefor including a load carrying axle, a carrier pivotally mounted thereon at each side of the vehicle, each carrier comprising a casing, stub axles journaled in the casing at opposite sides of the load carrying axle and at equidistant points therefrom, two wheels splined on each stub axle and disposed at opposite sides of the casing, and power transmission means for the respective stub axles disposed within each casing.

5. In eight wheel drive mechanism of the character set forth, a single load carrying axle, a carrier at each end thereof having oppositely extending aligned tubular sections concentric with the main tubular sections of the said load carrying axle, and means interposed between the load carrying axle and the proximate tubular extension on each carrier to mount the carriers pivotally on the load carrying axle.

6. In eight wheel drive mechanism of the character described, in combination with a single load carrying axle, carriers mounted pivotally at opposite ends thereof, live axles within the load carrying axle extending into said carriers and disposed on the rocking axes thereof, a drive gear on each live axle mounted within the respective carriers, wheel axles mounted in the respective carriers at opposite sides of the said drive gear, a pair of wheels positioned on opposite sides of a load carrying axle, said wheels being journaled on the free ends of the wheel axles and on opposite sides of the respective carriers, and gearing interposed between each of the drive gears and the respective wheel axles, said gearing being mounted within the respective carriers.

7. In eight wheel drive mechanism of the character described, in combination with a single load carrying axle, carriers mounted pivotally at opposite ends thereof, live axles within the load carrying axle extending into said carriers and disposed on the rocking axes thereof, a drive gear on each live axle mounted within the respective carriers, wheel axles mounted in the respective carriers at opposite sides of the said drive gear, gearing interposed between each of the drive gears and the respective wheel axles, a pair of wheels positioned on opposite sides of the load carrying axle, said wheels being journaled on the free ends of the wheel axles and on opposite sides of the respective carriers, said gearing being mounted within the respective carriers, and separate antifriction bearings mounted within the respective carriers for each of the gears.

8. In a motor vehicle, an eight wheel driving unit comprising a four wheel unit on opposite sides of the vehicle, each wheel of said unit being independent of the others and removable as such, and means intermediate the four wheel units for effecting an equal distribution of the driving torque to said units.

9. In a driving mechanism for motor vehicles embodying in combination an eight wheel traction unit comprising two four wheel units, each wheel of said unit being independent of the others and removable as such, a power distributing means located substantially central of each four wheel unit, and means for driving said distributor, whereby a balanced distribution of power to the eight wheel unit is effected.

10. In a motor vehicle, an eight-wheel traction unit comprising two four-wheel units, each unit embodying four independent wheel assemblies removable as such, a power distributor mounted substantially central of each four-wheel unit, comprising a chain of gearing and means for driving said gearing, whereby, a balanced distribution of power to the eight-wheel unit is effected.

11. A driving mechanism for motor vehicles embodying in combination a driving shaft, a driven shaft, and a differential connection therebetween, and a traction unit composed of two pairs of traction members, each pair including four independently removable wheel assemblies, and means in connection with the traction unit and driven shaft for effecting a balanced transmission of power from the driven shaft to the respective four-wheel members of the traction unit.

12. A driving mechanism for motor vehicles embodying in combination an eight-wheel traction unit comprising two pairs of traction wheels on each side of the chassis, a carrier casing located centrally of each four-wheel unit and interconnecting said pairs, a driven means within said casing associated with said pairs, and means for driving said driven means, whereby a balanced transmission of power to the traction unit is effected.

13. A driving mechanism for motor vehicles, comprising pairs of wheels on each side of the vehicle, a drive shaft common to said pairs and about which axis they are adapted to oscillate, means for driving said pairs arranged symmetrically about said axis intermediate said wheels and interconnecting said pairs and drive shaft, and means for driving said shaft.

14. A driving mechanism of the character specified comprising in combination a road vehicle, a driving axle arranged transverse of this vehicle, wheels disposed in pairs on opposite sides of each extremity of the axle, means affording an oscillatory connection between the respective pairs of wheels and the extremities of the axle with which they are associated, and a gearing in connection with the last mentioned means and establishing a drive between the axle and said wheels, said gearing being arranged symmetrically about the axis of oscillation of said pairs to permit the oscillation thereof about said axis.

This specification signed this 5th day of February, A. D. 1929.

JOHN WALTER CHRISTIE.